(12) United States Patent
Soga et al.

(10) Patent No.: US 6,449,948 B2
(45) Date of Patent: Sep. 17, 2002

(54) HYDRAULIC CIRCUIT CLEANING APPARATUS AND METHOD

(75) Inventors: Yoshinobu Soga, Toyota; Ryoji Habuchi, Okazaki; Hiroshi Morioka, Toyota; Shinji Kasuga, Anjo; Hideki Yasue, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/861,515

(22) Filed: May 22, 2001

(30) Foreign Application Priority Data

May 22, 2000 (JP) ........................................ 2000-150404

(51) Int. Cl.[7] .............................................. F16D 31/02
(52) U.S. Cl. ............................. 60/327; 60/454; 60/494
(58) Field of Search ........................... 60/327, 453, 454, 60/494

(56) References Cited

U.S. PATENT DOCUMENTS

| | | | | |
|---|---|---|---|---|
| 4,694,649 A | * | 9/1987 | Howeth ..................... 60/494 X |
| 4,721,185 A | * | 1/1988 | Weigle ..................... 60/453 X |
| 4,731,999 A | * | 3/1988 | Niemeic .................... 60/494 X |
| 5,471,838 A | * | 12/1995 | Suzuki et al. .............. 60/494 X |
| 5,600,953 A | * | 2/1997 | Oshita et al. ................. 60/453 |
| 5,630,316 A | * | 5/1997 | Itsuji et al. ............... 61/494 X |
| 6,374,603 B1 | * | 4/2002 | Morita et al. ............. 60/494 X |

FOREIGN PATENT DOCUMENTS

| | | | | |
|---|---|---|---|---|
| DE | 27 49 267 A1 | * | 5/1978 | .................. 60/494 |
| JP | 57-47002 | * | 3/1982 | .................. 60/494 |
| JP | 0037734 A | | 2/1998 | |

* cited by examiner

Primary Examiner—John E. Ryznic
(74) Attorney, Agent, or Firm—Oblon, Spivak, McClelland, Maier & Neustadt, P.C.

(57) ABSTRACT

A hydraulic circuit cleaning apparatus has a hydraulic circuit that includes an oil pump, an oil passage to which the oil pressure ejected from the oil pump is supplied, and a pressure regulator device connected to the oil passage for regulating the oil pressure in the oil passage. The apparatus cleans the hydraulic circuit by using a cleaning liquid. A discharge oil passage is connected to a discharge port of the pressure regulator device, so that the cleaning liquid is discharged out of the hydraulic circuit via the discharge oil passage.

10 Claims, 7 Drawing Sheets

HYDRAULIC CIRCUIT CLEANING APPARATUS AND METHOD

INCORPORATION BY REFERENCE

The disclosure of Japanese Patent Application No. 2000-150404 filed on May 22, 2000 including the specification, drawings and abstract is incorporated herein by reference in its entirety.

BACKGROUND OF THE INVENTION

1. Field of the Invention

The present invention relates to a cleaning apparatus and a cleaning method for removing foreign substances from a hydraulic circuit.

2. Description of the Related Art

Generally, in a vehicle equipped with an automatic transmission, a hydraulic control apparatus and an electronic control apparatus are provided. The hydraulic control apparatus includes a hydraulic circuit provided with oil passages for supplying and discharging oil pressure with respect to operation mechanisms of the automatic transmission, and various valves for controlling the opening and closing of the oil passages and the oil pressure in the oil passages. The electronic control apparatus is formed by a microcomputer. Various kinds of data are pre-stored in the electronic control apparatus. The electronic control apparatus is designed so that signals from various sensors and switches are inputted to the electronic control apparatus.

The electronic control apparatus makes determinations regarding the control of the transmission speed ratio based on the signals from the various sensors and switches and the aforementioned data, and outputs a control signal based on a result of the determination to the hydraulic control apparatus. As a result, the supplying/discharging of oil pressure with respect to the operational mechanisms and the oil pressure supplied thereto are controlled so as to control the speed ratio of the automatic transmission. The oil pressure supplied to the hydraulic circuit is generated by a pressure regulator device regulating the pressure ejected from an oil pump.

A hydraulic circuit as mentioned above is formed by a component part termed a "valve body". Such a valve body is mounted between an oil pan and a casing forming an outer shell of the automatic transmission. However, before the valve body is mounted between the casing and the oil pan, the hydraulic circuit is usually cleaned since there is a possibility of contamination of an interior of the hydraulic circuit with foreign substances.

As an art related to the hydraulic circuit cleaning apparatus as mentioned above, Japanese Patent Application Laid-Open No. HEI 10-37734 describes an example of the method for cleaning an oil supplying apparatus and a lubricant supplying apparatus used in a lubrication system of an electric power generating steam turbine, an electric power generator, etc. This laid-open patent application describes a normal-use oil pump provided in an oil tank, two oil coolers, and six nozzles that are opened and closed by an oilcooler switching valve. The patent application further describes a flushing oil pump connected to a circuit of the oil tank, and a plurality of valves for opening and closing an oil passage between the circuit and the flushing pump. Oil supplied from the normal-use oil pump is supplied to an inlet of one of the two oil coolers, and is thereby cooled. After that, oil is discharged from an outlet of the oil cooler, and is delivered to a bearing supply line. Furthermore, using oil ejected from the flushing oil pump, the oil passage in the oil tank can be cleaned.

The method of cleaning an oil supplying apparatus described in the aforementioned patent application is one in Which an oil passage provided in the oil tank is flushed. However, the patent application does not describe the cleaning of a hydraulic circuit that includes an oil pump and a pressure regulating device.

SUMMARY OF THE INVENTION

The invention has been accomplished in view of the aforementioned circumstances. The invention provides an apparatus and a method for cleaning hydraulic circuit which are capable of cleaning a hydraulic circuit that is provided with an oil pump, a pressure regulator device, etc.

A hydraulic circuit cleaning apparatus in accordance with a first mode of the invention includes a hydraulic circuit, and a discharge passage that discharges from the hydraulic circuit a cleaning liquid provided for cleaning the hydraulic circuit. The hydraulic circuit includes an oil pump, an oil passage to which an oil pressure ejected from the oil pump is supplied, and a pressure regulator device that is connected to the oil passage and that regulates the oil pressure in the oil passage. The discharge passage is connected to a discharge port of the pressure regulator device, and discharges the cleaning liquid out of the hydraulic circuit.

According to the first mode, when the cleaning liquid is delivered into the oil passage of the hydraulic circuit, the cleaning liquid is discharged into the discharge oil passage via the discharge port of the pressure regulator device. Then, the cleaning liquid is discharged from the discharge oil passage via the discharge passage. Therefore, the cleaning liquid containing foreign substances is not returned to the hydraulic circuit. Therefore, the interior of the hydraulic circuit can be cleaned by utilizing the discharge oil passage connected to the pressure regulator device.

The above-described cleaning apparatus may further include a lid member that closes the discharge passage after the hydraulic circuit is cleaned with the cleaning liquid.

If the cleaning liquid discharge passage is closed with the lid member after the hydraulic circuit is cleaned, the oil delivered into the oil passage by the oil pump will not be discharged from the cleaning liquid discharge passage.

The cleaning apparatus of the first mode may be constructed so that the oil pressure discharged from the discharge port of the pressure regulator device is supplied to the suction opening of the oil pump when the oil pump sucks the oil, provided that the discharge passage is closed with the lid member after the hydraulic circuit has been cleaned.

A hydraulic circuit cleaning apparatus in accordance with a second mode of the invention includes a hydraulic circuit, and a discharge passage that discharges from the hydraulic circuit a cleaning liquid for cleaning the hydraulic circuit. The hydraulic circuit includes an oil pump, a circulating oil passage, and a pressure regulator device disposed in the circulating oil passage for regulating the oil pressure in the oil passage. The discharge passage is connected between the pressure regulator device in the circulating oil passage and the suction opening of the oil pump, and discharges the cleaning liquid out of the hydraulic circuit.

According to the second mode, when the cleaning liquid is delivered into the oil passage of the hydraulic circuit, the cleaning liquid is delivered to the circulating oil passage, and is discharged from the discharge passage via the pressure regulator device. Therefore, the cleaning liquid contaminated with foreign substances will not be returned into the hydraulic circuit. Hence, the interior of the hydraulic circuit can be cleaned by simply utilizing the discharge oil passage connected to the pressure regulator device.

The cleaning apparatus of the second mode may further include a sealing member that closes the discharge passage, and the hydraulic circuit may further include a filtering device that filters oil sucked into the suction opening of the oil pump.

The filtering device may be constructed so as to also perform the function of preventing the plug from falling apart. In that case, it is unnecessary to provide a separate member for preventing the plug from falling apart.

In a cleaning method for cleaning a hydraulic circuit in accordance with a third mode of the invention, the hydraulic circuit includes an oil pump, an oil passage connected to a suction port of the oil pump, a pressure regulator device that is connected to the oil passage and that regulates the oil pressure in the oil passage, and a discharge oil passage connecting a discharge port of the pressure regulator device and the suction port of the oil pump, and the cleaning liquid used to clean the hydraulic circuit is discharged via the discharge oil passage.

According to the third mode, the cleaning liquid used to clean the hydraulic circuit is discharged out of the hydraulic circuit via the discharge oil passage. Therefore, the method prevents the cleaning liquid contaminated with foreign substances from circulating in the hydraulic circuit. Hence, the method makes it possible to clean the interior of the hydraulic circuit by using the discharge oil passage connected to the pressure regulator device.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Figure 2:
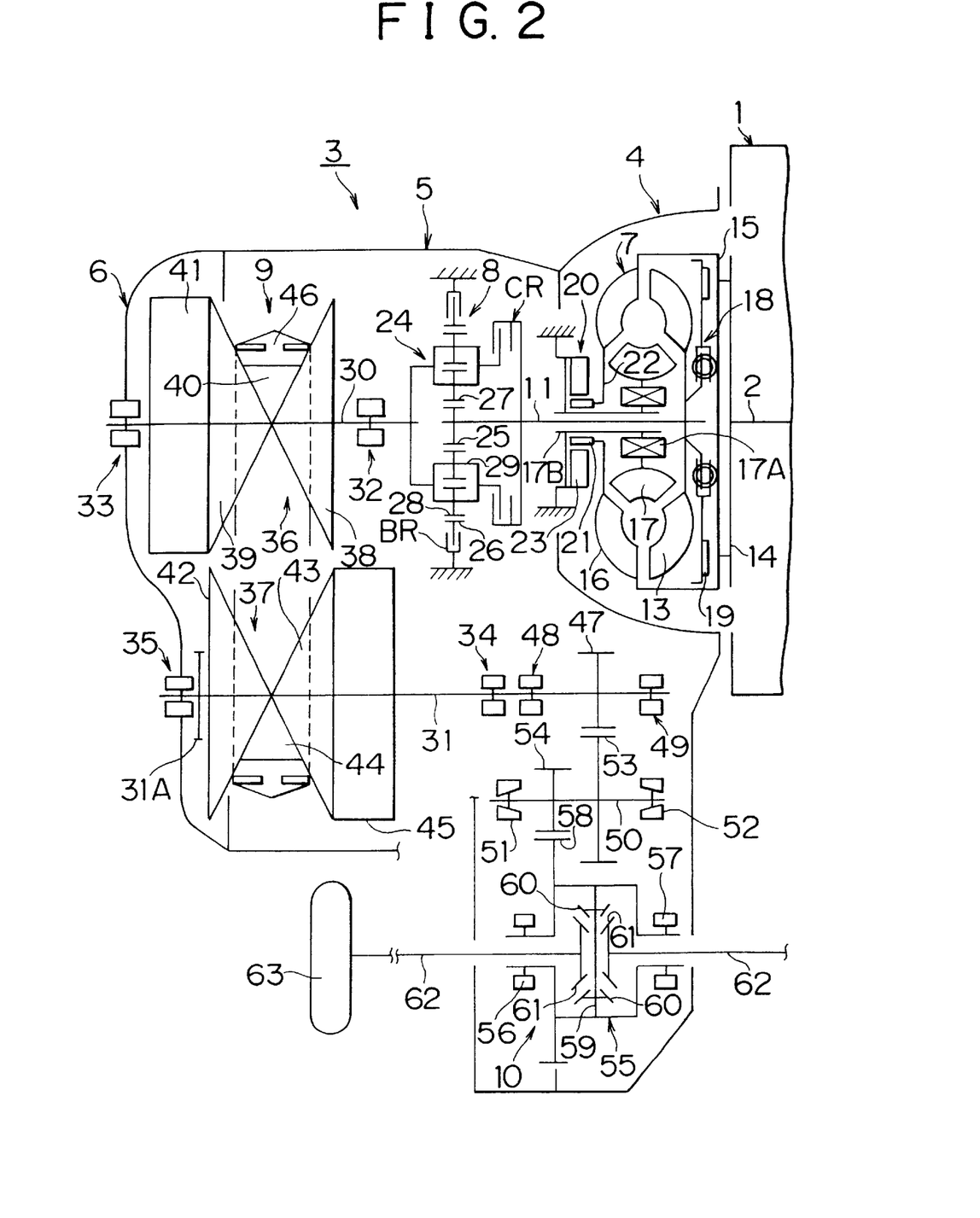
FIG. 2 is a skeleton diagram illustrating a power transmission path of an FF vehicle to which the invention is applied.

The preferred embodiments of the invention will hereinafter be described in detail with reference to the attached drawings. FIG. 2 is a skeleton diagram showing a front-engine, front-drive vehicle to which this invention is applied. Referring to FIG. 2, an engine 1 is installed as a power source for a vehicle. An internal combustion engine, more particularly a gasoline engine, diesel engine, or an LPG engine, may used as the engine 1. A crankshaft 2 of the engine 1 is disposed in the width direction of the vehicle. For the sake of convenience, the following description assumes that a gasoline engine is used as the engine 1.

A transaxle 3 is provided on the output side of the engine 1. The transaxle 3 has a transaxle housing 4, a transaxle case 5, and a transaxle cover 6. The transaxle housing 4 is attached to the rear end of the engine 1. The transaxle case 5 is mounted on the end of an opening in the transaxle housing 4 opposite the engine 1. The transaxle cover 6 is mounted on the end of an opening in the transaxle case 5 opposite the transaxle housing 4. A valve body unit and an oil pan are attached to a lower portion of the transaxle case 5.

A torque converter 7 is provided inside the transaxle housing 4. A forward-reverse selection mechanism 8, variable belt transmission (CVT) 9, and a final reduction gear (in other words, a differential gear system) 10 are provided inside the transaxle case 6 and the transaxle rear cover 6. The construction of the torque converter 7 will first be described. An input shaft 11 that can rotate about the same axis as the crankshaft 2 is provided in the transaxle housing 4. A turbine runner 13 is mounted on the end of the input shaft 11 on the side of the engine 1.

A front cover 15 is communicated via a drive plate 14 to the rear end of the crankshaft 2 and a pump impeller 15 is connected to the front cover 15. The turbine runner 13 and the pump impeller 16 are disposed opposing one another and a stator 17 is provided inside the turbine runner 13 and the pump impeller 16. A hollow shaft 17B is connected by way of a one-way clutch 17A to the stator 17. The input shaft 11 runs through this hollow shaft 17B. A lockup clutch 19 is provided via a damper mechanism 18 on the end of the input shaft 11 on the side of the front cover 15. Oil as a hydraulic fluid is supplied to the inside of a casing (not shown) formed by the front cover 15, pump impeller 16, and other components as noted above.

With this configuration, a power (torque) from the engine 1 is transmitted through the crankshaft 2 to the front cover 15. If the lockup clutch 19 is disengaged at this time, torque of the pump impeller 16 is transmitted to the turbine runner 13 and then to the input shaft 11 through the fluid. The torque transmitted from the pump impeller 16 to the turbine runner 13 may be amplified by the stator 17. On the other hand, if the lockup clutch 19 is engaged at this time, the torque of the front cover 15 is mechanically transmitted to the input shaft 11.

An oil pump 20 is provided between the torque converter 7 and the forward-reverse selection mechanism 8. A rotor 21 of the oil pump 20 and the pump impeller 16 are connected by a hub 22 of cylindrical shape. A body 23 of the oil pump 20 is secured to a side of the transaxle case 5. The hub 22 and the hollow shaft 17B are insplined engagement with each other. This configuration allows power from the engine 1 to be transmitted via the pump impeller 16 to the rotor 21, thus driving the oil pump 20.

The forward-reverse selection mechanism 8 is provided along a power transmission path between the input shaft 11 and the variable belt transmission 9. The forward-reverse selection mechanism 8 is provided with a planetary gear mechanism 24 of a double-pinion type. The planetary gear mechanism 24 comprises a sun gear 25 provided on the end of the input shaft 11 on the side of the variable belt transmission 9, a ring gear 26 disposed concentrically with the sun gear 25 on an outer peripheral side of the sun gear 25, a pinion gear 27 that is meshed with the sun gear 25, a pinion gear 28 that is meshed with the pinion gear 27 and the ring gear 26, and a carrier 29 which rotatably retains the pinion gears 27 and 28, as well as retains the pinion gears 27 and 28 so that they can rotate integrally around the sun gear 25. The carrier 29 is connected to a primary shaft (to be described later) of the input shaft 11. In addition, a forward clutch CR, which connects and disconnects a power transmission path between the carrier 29 and the input shaft 11, is provided. Further, a reverse brake BR, which controls rotation and lockup of the ring gear 26, is provided on a side of the transaxle case 5.

The variable belt transmission 9 is provided with a primary shaft 30 disposed concentrically with the input shaft 11 (in other words, a shaft on the drive side) and a secondary shaft 31 disposed in parallel with the primary shaft 30 (in other words, a countershaft or a shaft on the driven side). Bearings 32 and 33 rotatably retain the primary shaft 30 and bearings 34 and 35 rotatably retain the secondary shaft 31.

The primary shaft 30 is provided with a primary pulley 36 and the secondary shaft 31 is provided with a secondary pulley 37. The primary pulley 36 is provided with a fixed sheave 38 (in other words, a fixed member) formed integrally with the primary shaft 30 on its periphery and a movable sheave 39 (in other words, a movable member) configured so as to be movable in an axial direction of the primary shaft 30. A V-shaped groove 40 is formed between opposing faces of the fixed sheave 38 and the movable sheave 39.

Furthermore, a hydraulic actuator 41 (in other words, a hydraulic servo mechanism) that causes the movable sheave 39 to approach and separate from the fixed sheave 38 by moving the movable sheave 39 in the axial direction of the primary shaft 30 is provided. Meanwhile, the secondary pulley 37 is provided with a fixed sheave 42 (in other words, a fixed member) formed integrally with the secondary shaft 31 on the periphery thereof and a movable sheave 43 (in other words, a movable member) configured so as to be movable in an axial direction of the secondary shaft 31. A V-shaped groove 44 is formed between opposing faces of the fixed sheave 42 and the movable sheave 43. In addition, a hydraulic actuator 45 (in other words, a hydraulic servo mechanism) that causes the movable sheave 43 to approach and separate from the fixed sheave 42 by moving the movable sheave 43 in the axial direction of the secondary shaft 31 is provided.

A belt 46 is wound around the groove 40 of the primary pulley 36 and the groove 44 of the secondary pulley 37 in the configuration. The belt 46 is provided with multiple metal blocks and a plurality of steel rings. A counter driven gear 47 of a cylindrical shape is secured to the secondary shaft 31 on the side of the engine 1 and the counter driven gear 47 is retained by bearings 48 and 49. The bearing 35 is provided on the side of the transaxle rear cover 6 and a parking gear 31A is provided on the secondary shaft 31 between the bearing 35 and the secondary pulley 37.

An intermediate shaft 50 that is parallel with the secondary shaft 31 is provided along a power transmission path between the counter driven gear 47 and the final reduction gear 10 of the variable belt transmission 9. The intermediate shaft 50 is supported by bearings 51 and 52. A counter driven gear 53 and a final drive gear 54 are formed on the intermediate shaft 50. The counter drive gear 47 is meshed with the counter driven gear 53.

The final reduction gear 10 is provided with a hollow differential case 55. The differential case 55 is rotatably retained by bearings 56 and 57 and a ring gear 58 is provided on an outer periphery of the differential case 55. The final drive gear 54 is meshed with the ring gear 58. A pinion shaft 59 is mounted inside the differential case 55 and two pinion gears 60 are mounted on the pinion shaft 59. Two side gears 61 are meshed with these pinion gears 60. A front drive shaft 62 is connected independently to each of the two side gears 61 and a wheel (front wheel) 63 is connected to each of these front drive shafts 62.

Figure 3:
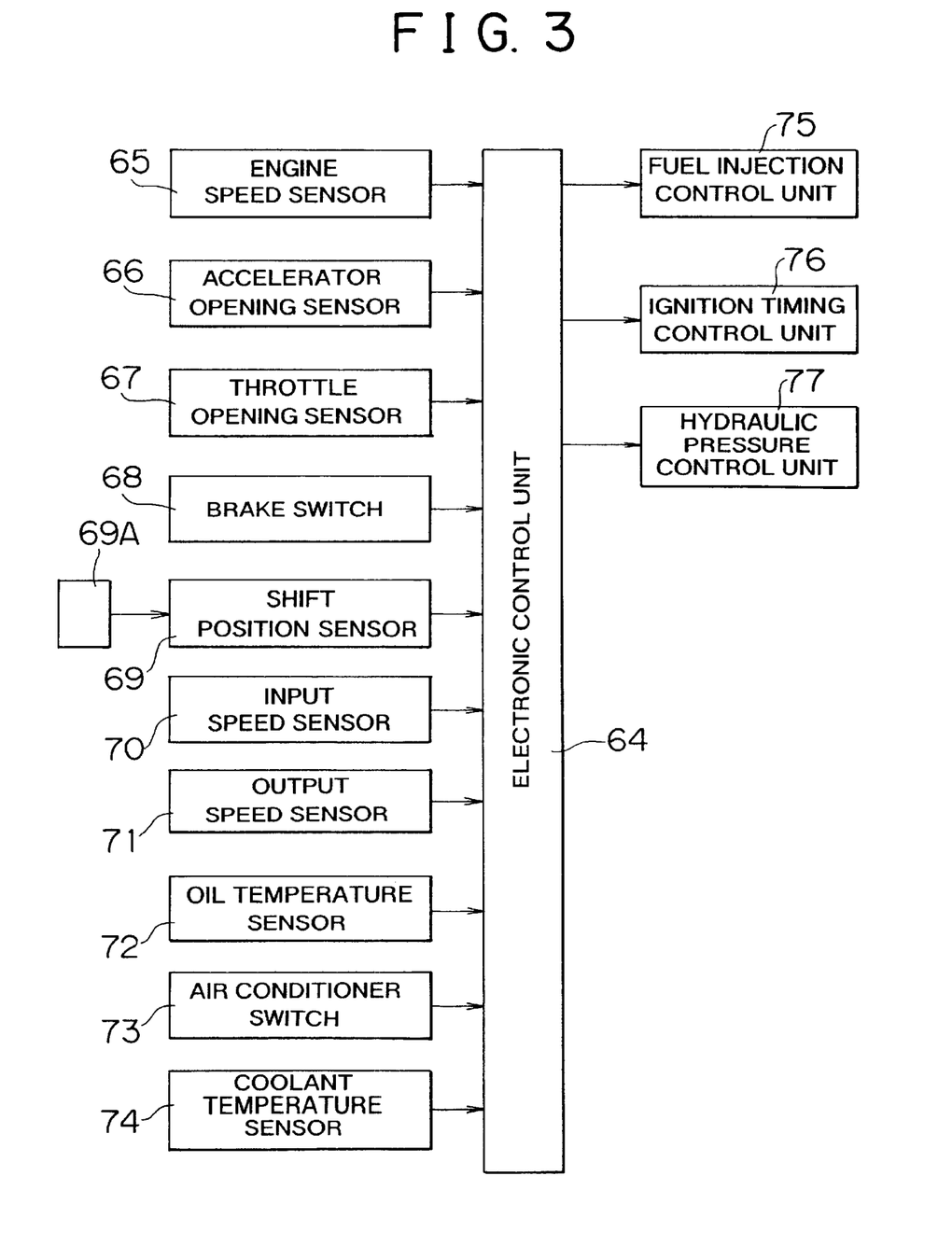
FIG. 3 is a block diagram illustrating a control system of the vehicle shown in FIG. 2.

FIG. 3 is a block diagram showing a control system of the vehicle shown in FIG. 2. An electronic control unit 64 that controls the entire vehicle is made up of a microprocessor comprising mainly a computer processing unit (CPU or MPU), storage devices (RAM and ROM), and an I/O interface.

Signals are input to this electronic control unit 64 from such devices as an engine speed sensor 65, an accelerator opening sensor 66, a throttle opening sensor 67, a brake switch 68, a shift position sensor 69 that detects the operating condition of a shift position selection unit 69A, an input speed sensor 70 that detects the input speed of the variable belt transmission 9, an output speed sensor 71 that detects the output speed of the variable belt transmission 9, an oil temperature sensor 72 that detects the hydraulic fluid temperature of the variable belt transmission 9 and the torque converter 7, an air conditioner switch 73, and a coolant temperature sensor 74 that detects coolant temperature of the engine 1.

The signal fed from the shift position sensor 69 is used to determine which is selected, either a drive position [for example, D (drive) position, R (reverse) position, etc.] or a non-drive position [for example, N (neutral) position, P (park) position, etc.]. It is further used to determine which is selected of the two drive positions, either a forward position (for example, D position) or a reverse position (R position). Furthermore, a vehicle speed and a gear ratio of the variable belt transmission 9 can be calculated by using a signal from the engine speed sensor 65, a signal from the input speed sensor 70, and a signal from the output speed sensor 71 and the like.

Figure 4:
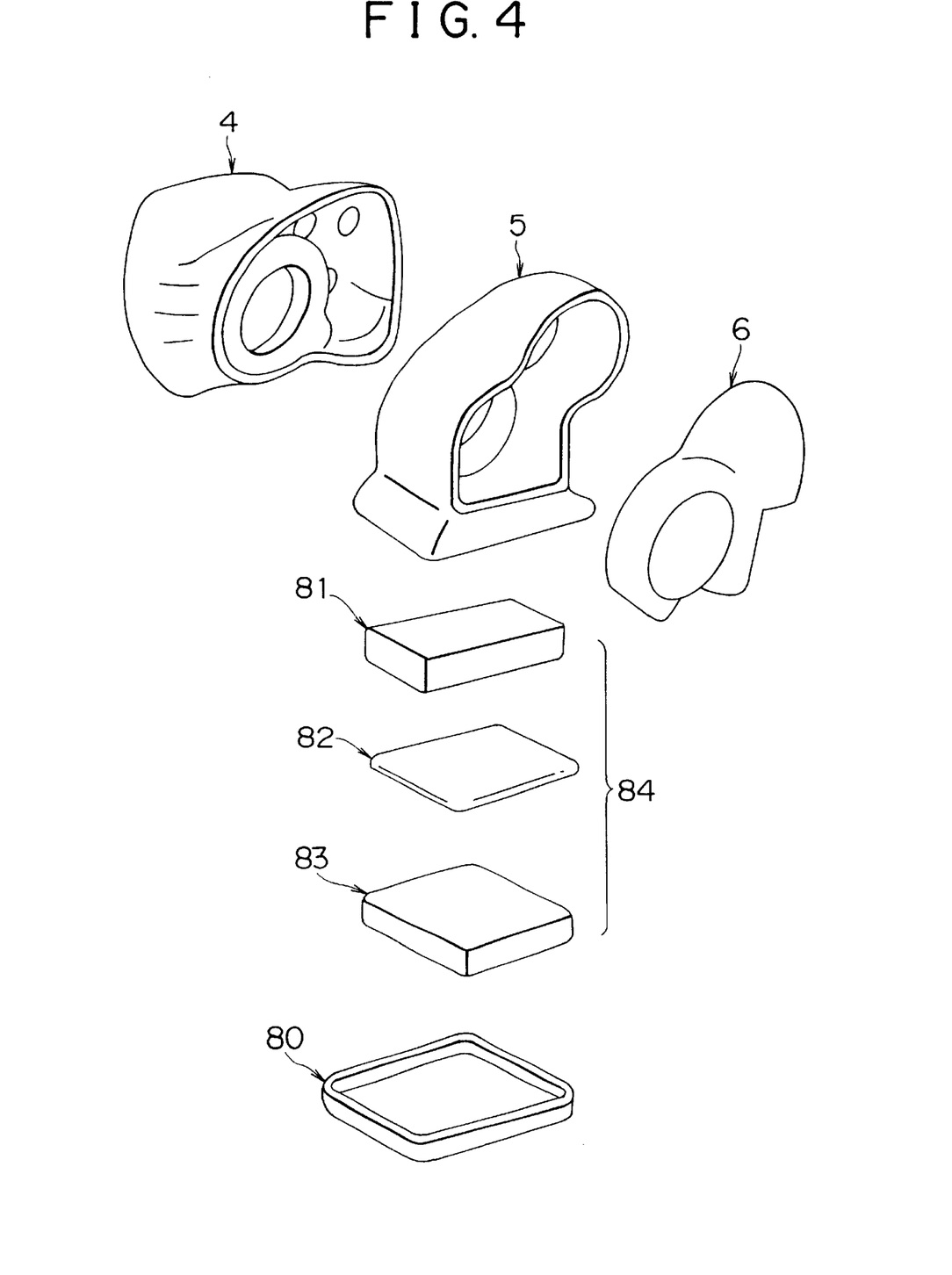
FIG. 4 is an exploded perspective view of some of the components of atransaxle shown in FIG. 2.

The electronic control unit 64 outputs a signal that controls a fuel injection control unit 75 of the engine 1, a signal that controls an ignition timing control unit 76 of the engine 1, and a signal that controls a hydraulic pressure control unit 77. A construction of the hydraulic pressure control unit 77 will be described. FIG. 4 is an exploded view of some of the component parts of the transaxle 3. An oil pan 80 is attached to a lower portion of the transaxle case 5. A valve body unit 84 formed by integrally assembling an upper valve body 81, a plate 82 and a lower valve body 83 are provided between the transaxle case 5 and the oil pan 80. The valve body unit 84 forms a hydraulic circuit.

Figure 1:
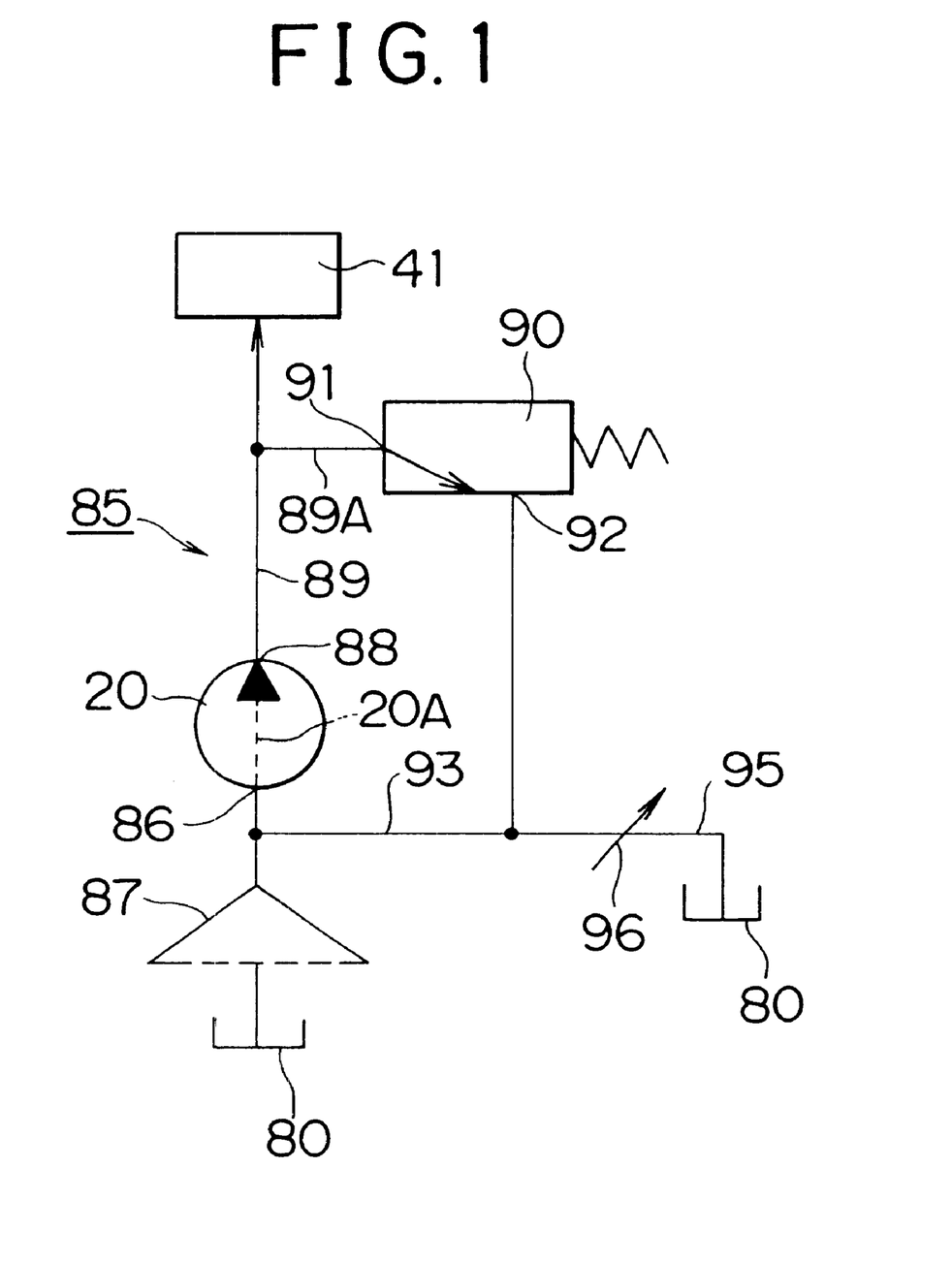
FIG. 1 is a schematic diagram illustrating a portion of a hydraulic circuit of a belt-type continuously variable transmission to which the invention is applied.
Figure 5:
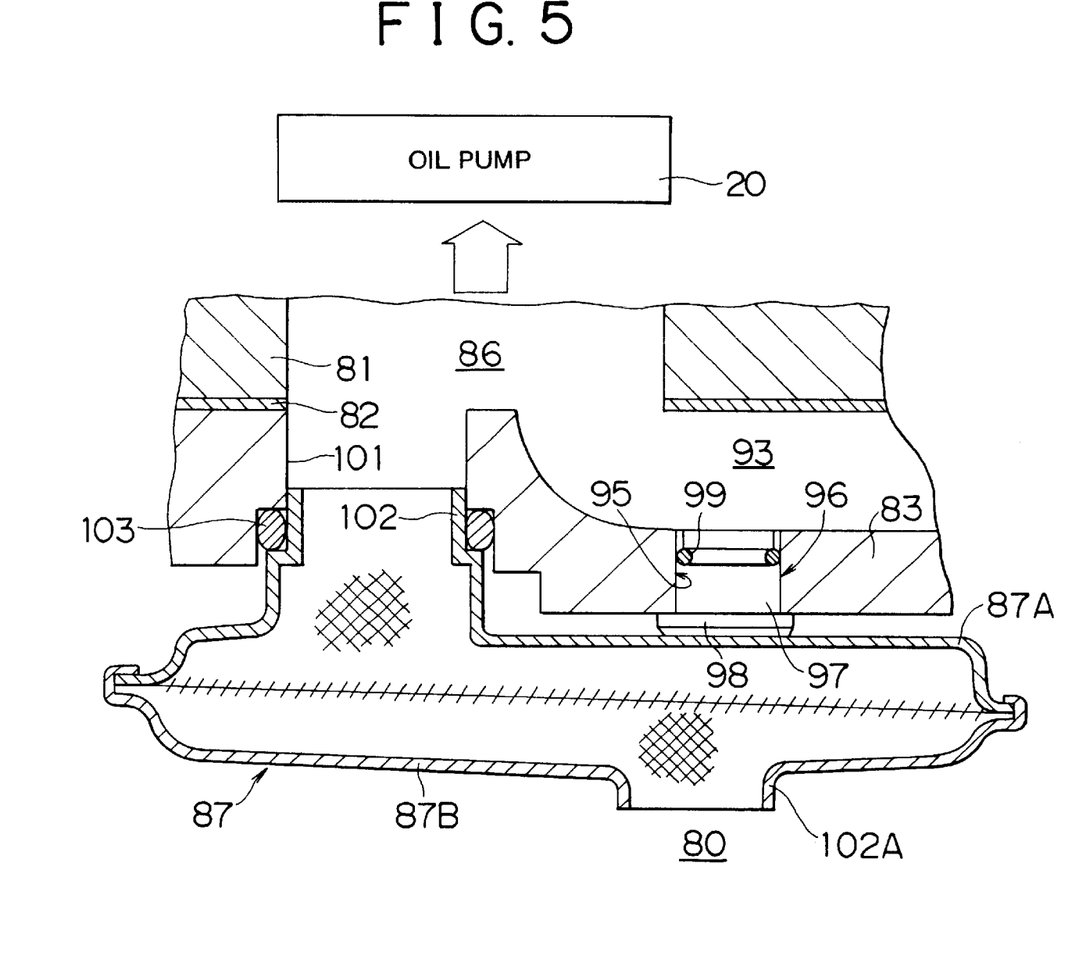
FIG. 5 is a sectional view more specifically illustrating the construction shown in FIG. 1.

FIG. 1 is a schematic diagram illustrating a portion of a hydraulic circuit 85 formed by the valve body unit 84. FIG. 5 is a sectional view of specific component parts forming the hydraulic circuit 85 shown in FIG. 1. A strainer 87 is provided in a path extending from the oil pan 80 to a suction opening 86 of the oil pump 20. A construction for mounting the strainer 87 will be specifically described. A passage 101 is formed in the lower valve body 83. The passage 101 connects to the side of the suction opening 86.

The strainer 87 is formed by disposing two divisions 87A, 87B in a vertical positional relationship and integrally joining the divisions. A division 87A is disposed above the other division 87B. The division 87A has a cylindrical ejection portion 102 that is protruded toward the lower valve body 83. A cylindrical suction portion 102A is protruded toward the oil pan 80. An outer peripheral surface of the ejection portion 102 is fitted to an inner peripheral surface of the passage 101. Due to this fitting force, the strainer 87 is secured to the lower valve body 83. An O-ring 103 is attached to an outer periphery of the ejection portion 102, thus providing a liquid-tight seal between the ejection portion 102 and the lower valve body 83.

An oil transportation path 20A connecting the suction opening 86 and an ejection opening 88 is formed in the oil pump 20. An oil passage 89 is connected to the ejection opening 88. The oil passage 89 is also connected to an oil chamber (not shown) of a hydraulic actuator 41.

The hydraulic circuit 85 is also provided with a pressure regulator valve 90. The pressure regulator valve 90 has a pressure regulation port 91 and a discharge port 92. An oil passage 89A branching from an intermediate portion of the oil passage 89 is connected to the pressure regulation port 91. The pressure regulator valve 90 has a known construction provided with a spool (not shown), a spring (not shown), etc. The pressure regulator valve 90 is used for controlling the oil pressure at the ejection side of the pressure regulator valve 90. The pressure regulation port 91 and the hydraulic actuator 41 are disposed in parallel.

A discharge oil passage (in other words, a relief oil passage or a circulating oil passage) 93 is formed connecting the discharge port 92 and the suction opening 86 of the oil pump 20. The discharge oil passage 93 is provided with a cleaning liquid discharge passage 95 that connects to the side of the oil pan 80.

As shown in FIG. 5, the cleaning liquid discharge passage 95 extends substantially vertically through the lower valve body 83. The cleaning liquid discharge passage 95 is formed above the strainer 87. A plug 96 is provided for opening and closing the cleaning liquid discharge passage 95. The plug 96 has a shaft portion 97 and a head portion 98. An O-ring 99 is attached to an outer periphery of the shaft portion 97. The shaft portion 97 of the plug 96 is fitted into the cleaning liquid discharge passage 95 from the side of the oil pan 80. The strainer 87 contacts a lower surface of the head portion 98 of the plug 96 fitted to the lower valve body 83.

The valve body unit 84 has a solenoid valve (not shown) for controlling the engagement and disengagement of the lockup clutch 19, a solenoid valve (not shown) for controlling the oil pressure supplied and discharged with respect to the oil chambers of the hydraulic actuators 41, 45, a solenoid (not shown) for controlling the oil pressure that acts on the forward clutch CR and the reverse brake BR, etc. The hydraulic circuit 85 is further provided with an oil passage (not shown) that connects to the hydraulic actuator 45.

Data used for providing a transmission control of the engine 1, lockup clutch 19, and the variable belt transmission 9 based on the various signals are stored in the electronic control unit 64. For example, the electronic control unit 64 stores data, with which an optimum operating condition of the engine 1 is selected by controlling the gear ratio of the variable belt transmission 9 based on the accelerator opening, vehicle speed, and other vehicle operating conditions. The electronic control unit 64 also stores a lockup clutch control map having the accelerator opening and vehicle speed as parameters. The lockup clutch 19 is controlled through each state of engagement, disengagement, and slip based on this lockup clutch control map. The electronic control unit 64 outputs control signals to the fuel injection control unit 75, the ignition timing control unit 76, and the hydraulic pressure control unit 77 based on the various signals input to the electronic control unit 64 and the data stored in the electronic control unit 64.

The corresponding relationships between the construction of this embodiment and the construction of the invention will now be described. The oil passage 89 corresponds to an oil passage in the invention. The pressure regulator valve 90 corresponds to a pressure regulator device in the invention. The plug 96 corresponds to a lid member and a sealing device in the invention. The oil passage 89, 89A and the discharge oil passage 93 correspond to a circulating oil passage in the invention. The strainer 87 corresponds to a filtering device in the invention.

An example of control content of a vehicle of this configuration will hereinafter be described. The forward-reverse selection mechanism 8 is controlled based on operation of the shift position selection unit 69A. When a forward position is selected, the forward clutch CR is engaged and the reverse brake BR is released, which results in the input shaft 11 being directly connected to the primary shaft 30. When the torque (or power) of the engine 1 is transmitted via the torque converter 7 to the input shaft 11 in this state, the input shaft 11, carrier 29, and the primary shaft 30 turn integrally. The torque of the primary shaft 30 is transmitted via the primary pulley 36, the belt 46, and the secondary pulley 37 to the secondary shaft 31.

The torque transmitted to the secondary shaft 31 is transmitted to the intermediate shaft 50 by way of the counter drive gear 47 and the counter driven gear 53. The torque transmitted to the intermediate shaft 50 is transmitted to the differential case 55 by way of the final drive gear 54 and the ring gear 58. When the differential case 55 turns, its torque is transmitted to the drive shaft 62 by way of the pinion gear 60 and the side gear 61, and then transmitted to the wheel 63.

When the reverse position is selected, on the other hand, the forward clutch CR is disengaged and the reverse brake BR is engaged, thus locking the ring gear 26. Then, as the input shaft 11 turns, the pinion gears 27 and 28 rotate while they rotate on their own axes. The carrier then rotates in a direction opposite the direction of rotation of the input shaft 11. As a result, the primary shaft 30, secondary shaft 31, intermediate shaft 50, and so forth rotate in a direction opposite that of when a forward position is selected, allowing the vehicle to reverse.

The gear ratio of the variable belt transmission 9 is controlled so that the operating conditions of the engine 1 may be optimized based on vehicle acceleration requirements evaluated with the vehicle speed, accelerator opening, and other conditions (namely, drive power requirements), data stored in the electronic control unit 64 (for example, an optimum fuel consumption curve having the engine speed and throttle opening as parameters), and other factors. To be more specific, the width of the groove 40 in the primary pulley 36 is varied by controlling the hydraulic pressure of the hydraulic chamber of the hydraulic actuator 41. As a result, the winding radius of the belt 4 of the primary pulley 36 is changed, which means that the ratio of the input speed to the output speed of the variable belt transmission 9, namely the gear ratio, is controlled steplessly (continuously).

Furthermore, by controlling the oil pressure in the oil chamber of the hydraulic actuator 45, the width of the groove 44 of the secondary pulley 37 is changed. That is, the clamping pressure (i.e., clamping force) of the secondary pulley 37 on the belt 31 in the direction of the axis thereof is controlled. Based on the clamping pressure, the tension of the belt 31 is controlled so that the contact surface pressure between the primary pulley 36 and the belt 31 and between the secondary pulley 37 and the belt 31 is controlled. The oil pressure in the oil chamber of the hydraulic actuator 45 is controlled based on the torque input to the variable belt transmission 9, the speed ratio of the variable belt transmission 9, etc. The torque input to the variable belt transmission 9 is determined based on the engine revolution speed, the degree of throttle opening, the torque ratio of the torque converter 7, etc.

Next described will be a flushing operation of cleaning the hydraulic circuit 85 of the valve body unit 84. During a process preceding the mounting of the valve body unit 84 between the transaxle case 5 and the oil pan 80 (i.e., a process before shipment of the transaxle 3 from a factory), a flushing operation of cleaning the interior of the hydraulic circuit 85 is performed to remove foreign substances, for example, waste, dust, or the like, which may be present within the hydraulic circuit 85.

Figure 6:
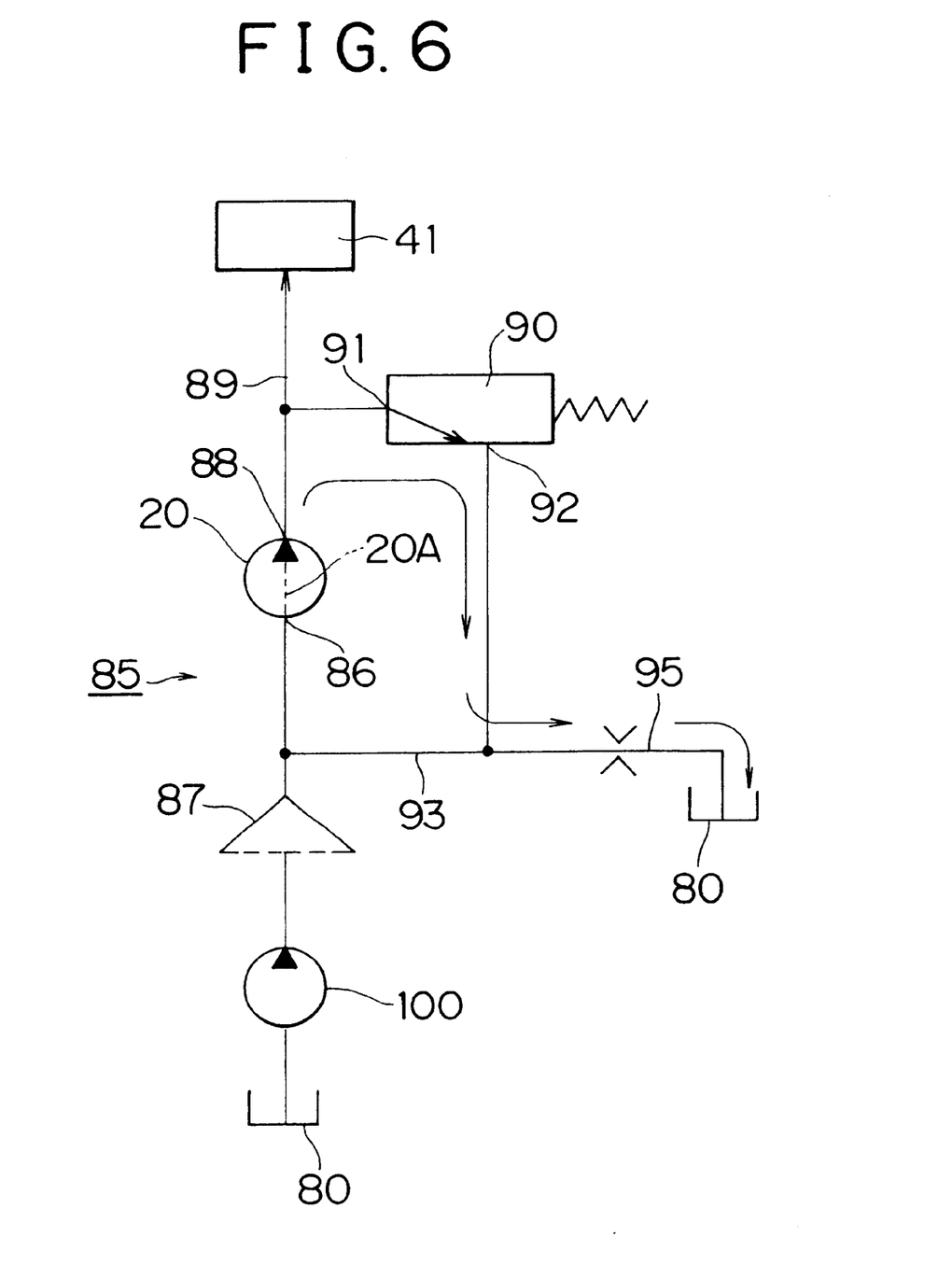
FIG. 6 is a schematic diagram illustrating acleaning method of a hydraulic circuit to which the invention is applied.

To perform the flushing operation, an oil pump 100, separate from the oil pump 20, is provided between the strainer 87 and the oil pan 80 as shown in FIG. 6, and the plug 96 is removed to open the cleaning liquid discharge passage 95. Then, using the oil pump 100, a cleaning liquid (which may be an automatic transmission fluid (ATF) that is the operating fluid of the transaxle 3) is supplied from the oil pan 80 into the hydraulic circuit 85. The cleaning liquid is pumped into the oil passage 89, and the pressure in the oil passage 89 rises to a predetermined pressure. Then, via the pressure regulator valve 90, the pressure regulation port 91 and the discharge port 92 are connected in communication, so that the cleaning liquid is discharged into the discharge oil passage 93 via the discharge port 92.

Since the cleaning liquid discharge passage 95 is opened as mentioned above, the cleaning liquid is discharged from the discharge oil passage 93 into the oil pan 80 via the cleaning liquid discharge passage 95. Therefore, the cleaning liquid used to remove foreign substances from the hydraulic circuit 85 will not return to the hydraulic circuit 85. After the cleaning of the hydraulic circuit 85 ends, the cleaning liquid discharge passage 95 is liquid-tightly closed by the plug 96 as shown in FIGS. 1 and 5, and the oil pump 100 is removed.

Alternatively, the oil pump 20 and the pressure regulator valve 90 can also be cleaned by driving the oil pump 20 and driving the oil pump 100 after mounting the valve body unit 84 and the strainer 87 below the transaxle case 5.

After the transaxle 3 is assembled, the ejection pressure of the oil pump 20 is supplied to the oil passage 89. The oil pressure in the oil passage 89 rises to a predetermined pressure. Then, via the pressure regulator valve 90, the pressure regulation port 91 and the discharge port 92 are connected in communication, so that oil is discharged from the pressure regulation port 91 into the discharge oil passage 93 via the discharge port 92. Since the cleaning liquid discharge passage 95 has been closed, the oil pressure in the discharge oil passage 93 is transmitted to the suction opening 86 of the oil pump 20. Thus, a circulating operation occurs in which the oil pressure ejected from the ejection opening 88 of the oil pump 20 is supplied back to the suction opening 86 of the oil pump 20 via the pressure regulator valve 90 and the discharge oil passage 93. That is, it can be said that the discharge oil passage 93 forms a super charge circuit.

Figure 7:
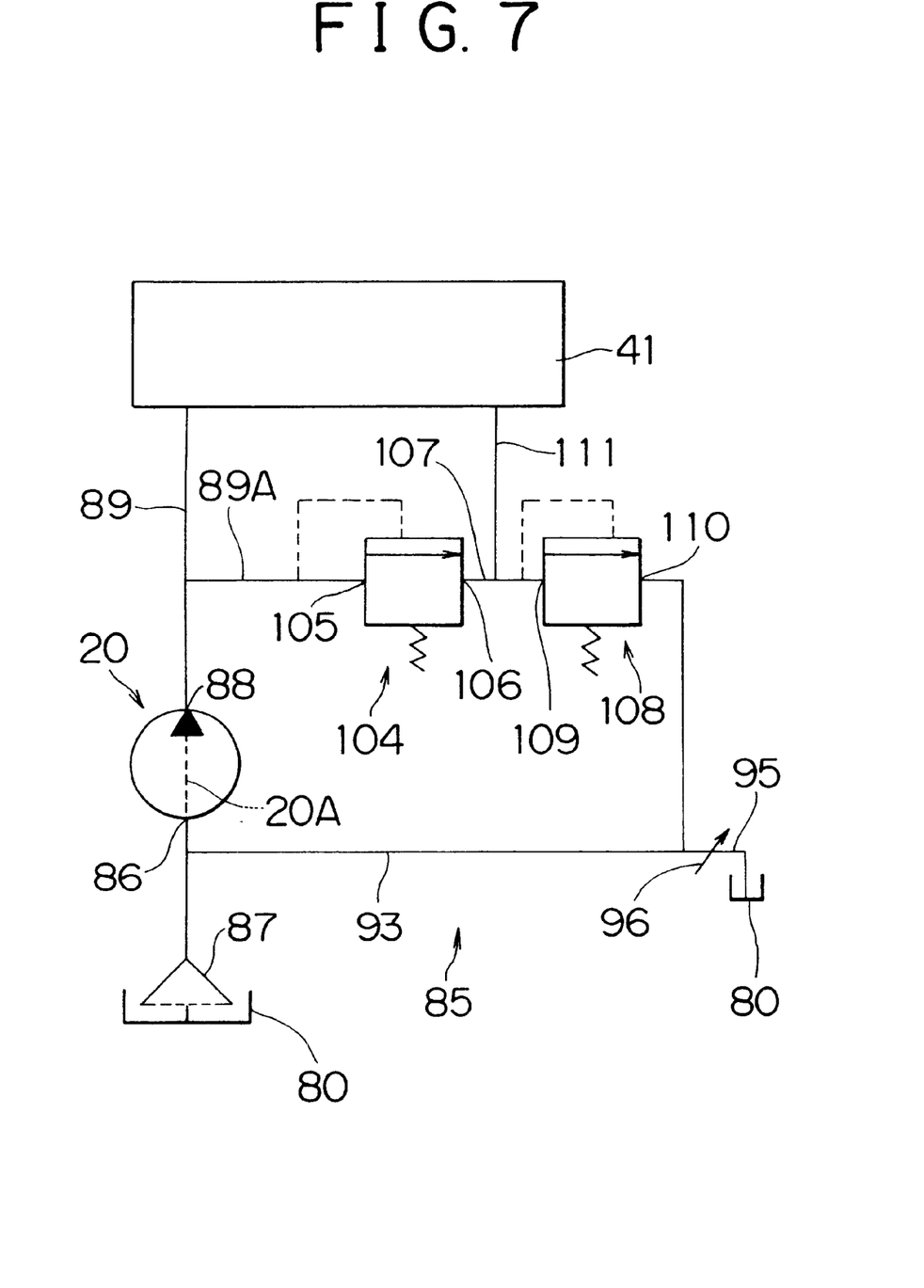
FIG. 7 is a schematic diagram of still another construction of an hydraulic circuit to which the invention is applied.

FIG. 7 illustrates another embodiment of the hydraulic circuit cleaning apparatus and cleaning method, showing a portion of a hydraulic circuit 85. In the hydraulic circuit 85 shown in FIG. 7, constructions substantially the same as those of the embodiment shown in FIGS. 1 to 6 are represented by reference characters which are the same as those used in FIGS. 1 to 6. Such constructions will not be described again.

In FIG. 7, the hydraulic circuit 85 has two pressure regulator valves 104, 108. The pressure regulator valve 104 has a pressure regulation port 105 and a discharge port 106. The pressure regulator valve 108 has a pressure regulation port 109 and a discharge port 110. An oil passage 89A branching from an oil passage 89 is connected to the pressure regulation port 105. The discharge port 106 and the pressure regulation port 109 are connected by an oil passage 107. The discharge port 110 is connected to the side of a suction opening 86 of an oil pump 20 via a discharge oil passage (i.e., a circulating oil passage a relief oil passage) 93. Thus, the pressure regulator valve 104 and the pressure regulator valve 108 are connected in series. An oil passage 111 connecting the hydraulic actuator 41 and the oil passage 107 is provided. In the hydraulic circuit 85 shown in FIG. 7, the pressure regulator valves 104, 108 correspond to a pressure regulator device in the invention. The oil passages 89, 89A, 107, 93 correspond to a circulating oil passage in the invention.

When a cleaning liquid is injected via the suction opening 86 of the oil pump 20 of the hydraulic circuit 85 of FIG. 7 with the plug 96 having been removed, the cleaning liquid reaches the pressure regulator valve 104 via the oil passages 89, 89A, and is discharged from the discharge port 106 of the pressure regulator valve 104, and reaches the pressure regulator valve 108 via the oil passage 107, and is discharged from the discharge port 110, and reaches the discharge oil passage 93. The cleaning liquid is then discharged from the discharge oil passage 93 into the oil pan 80 via the cleaning liquid discharge passage 95. Therefore, the cleaning liquid used to clean the interior of the hydraulic circuit 85 will not circulate in the hydraulic circuit 85. Thus, the hydraulic circuit 85 of this embodiment achieves substantially the same advantages as those achieved by the hydraulic circuit 85 shown in FIG. 1. Furthermore, after the plug 96 is attached to the hydraulic circuit 85 shown in FIG. 7, the hydraulic circuit 85 achieves substantially the same advantages as those achieved by the hydraulic circuit 85 shown in FIG. 1.

According to the embodiments shown in FIGS. 1 to 7, the flushing operation can be performed after the transaxle 3 is manufactured. Furthermore, after the flushing operation, the suction force of the oil pump 20 is supplemented with the oil pressure in the discharge oil passage 93, so that the oil suction function of the oil pump 20 improves. That is, it becomes possible to perform the flushing operation in a process after manufacture of the transaxle 3, without degrading the effect of re-supplying oil pressure to the suction opening 86 of the oil pump 20 (i.e., the super charge effect).

Furthermore, according to the embodiments, when the strainer 87 is secured to the lower valve body 83 after the cleaning liquid discharge passage 95 is closed by the plug 96, the strainer 87 contacts the head portion 98 of the plug 96 as shown in FIG. 5. That is, the strainer 87 performs both the function of cleaning oil supplied from the side of the oil pan 80 to the side of the strainer 87 and the function of preventing the plug 96 from falling from the lower valve body 83 (generally termed fall-apart preventing function). Therefore, it is unnecessary to separately provide a component part for preventing the plug 96 from falling. Hence, the number of component parts required for the cleaning apparatus is reduced, thereby allowing size and weight reductions of the apparatus and curbing increases in the production cost of the apparatus.

The foregoing embodiments are also applicable to automatic transmissions other than the continuously variable belt transmission, for example, an automatic transmission that has a planetary gear mechanism and friction engagement devices, such as clutches, brakes and the like, which are engaged and disengaged to change the torque transmission path. That is, each embodiment can be used as a hydraulic circuit cleaning apparatus for a hydraulic control apparatus that controls the engagement and disengagement of the friction engagement devices and the engagement pressure for the devices.

Furthermore, each embodiment can also be used as a hydraulic circuit cleaning apparatus for a hydraulic control apparatus of a toroidal type continuously variable transmission. The toroidal type continuously variable transmission refers to a continuously variable transmission having a plurality of cone discs each of which has a power transmission surface of anarcuate shape corresponding to the shape of an outer peripheral surface of a doughnut, and at least one power roller that contacts the power transmission surfaces of the cone discs via a lubricant (traction oil). By controlling the operation of the power roller through the use of the hydraulic control apparatus, the radius of the contact between the power roller and the power transmission surfaces is controlled to control the transmission speed ratio. The cleaning apparatus of each of the foregoing embodiments is applicable to the hydraulic circuit of the hydraulic control apparatus for controlling the power roller.

The foregoing embodiments are also applicable to vehicles that employ drive power sources other then internal combustion engines, for example, electric motors. The embodiments are also applicable to vehicles that incorporate combinations of engines and electric motors as drive power sources.

What is claimed is:

1. A hydraulic circuit cleaning apparatus coupled to a hydraulic circuit, comprising:
   an oil pump,
   an oil passage to which oil ejected from the oil pump is supplied, and
   a pressure regulator device that is disposed in the oil passage and that regulates the pressure of the oil in the oil passage, the pressure regulator device having a discharge port for discharging oil to the oil passage,
   a discharge passage that is connected to the discharge port and that is adapted to discharge a cleaning liquid out of the hydraulic circuit.

2. A cleaning apparatus according to claim 1, further comprising a lid member that closes the discharge passage.

3. A cleaning apparatus according to claim 2, wherein the discharge passage is closed by the lid member after the cleaning liquid flows through the hydraulic circuit and is discharged from the discharge passage.

4. A cleaning apparatus according to claim 1,
   wherein the oil pump has a suction opening,
   wherein the discharge port of the pressure regulator device is connected to the suction opening of the oil pump, and
   wherein the discharge passage is provided in a path from the discharge port to the suction opening of the oil pump.

5. A cleaning apparatus according to claim 1, wherein the pressure regulator device is adapted to connect the oil passage and the discharge passage in communication when a pressure in the oil passage is at least a predetermined pressure.

6. A hydraulic circuit cleaning apparatus in a hydraulic circuit comprising:
   a oil pump having an ejection opening for ejecting oil and a suction opening for sucking oil;
   a circulating oil passage that is connected to the ejection opening and to the suction opening;
   a pressure regulator device that is disposed in the circulating oil passage and that regulates at least the pressure of the oil at an ejection side of the oil pump; and
   a discharge passage that is connected between the pressure regulator device in circulating oil passage and the suction opening of the oil pump and that is adapted to discharge the cleaning liquid.

7. A cleaning apparatus according to claim 6, further comprising a sealing member that closes the discharge passage.

8. A cleaning apparatus according to claim 7, further comprising a filtering device that filters an oil sucked into the suction opening of the oil pump,
   wherein the sealing member is a plug that is inserted into the discharge passage to close the discharge passage, and
   wherein the filtering device is constructed so as to prevent the plug from falling from the discharge passage.

9. A cleaning method for cleaning a hydraulic circuit including an oil pump that sucks oil via a suction port and that ejecting the oil to a passage via an ejection port, a pressure regulator device that is connected to the ejection port and that regulates the oil pressure in the passage, the pressure regulator device having a discharge port for discharging the pressure regulated oil, and an oil passage connecting the suction port of the oil pump and the discharge port of the pressure regulator device, the cleaning method comprising:
   injecting a cleaning liquid into the hydraulic circuit;
   supplying the cleaning liquid to the pressure regulator device via the oil pump; and
   discharging the cleaning liquid from the oil passage.

10. A transmission that controls a speed shift via an oilamount, comprising:
    a speed changing mechanism that performs the speed shift upon being supplied with an oil from an oil passage for changing between at least two speed shift clutches; and
    a hydraulic circuit cleaning apparatus comprising a discharge passage that is connected to a discharge port of a pressure regulator device and that is adapted to discharge a cleaning liquid out of the hydraulic circuit; and
    a controller that controls an oil amount supplied to the speed changing mechanism via the hydraulic circuit.

* * * * *